Nov. 14, 1950     I. G. MALOFF     2,529,701

REAR PROJECTION VIEWING SCREEN

Filed May 13, 1947

FRONT

REAR

INVENTOR
Ioury G. Maloff
BY
ATTORNEY

Patented Nov. 14, 1950

2,529,701

UNITED STATES PATENT OFFICE 2,529,701

REAR PROJECTION VIEWING SCREEN

Ioury G. Maloff, Camden, N. J., assignor to Radio Corporation of America, a corporation of Delaware Application May 13, 1947, Serial No. 747,620

6 Claims. (Cl. 88—28.93)

This invention relates to improvements in viewing screens and has special reference to improvements in translucent screens for optical projection systems employing wide-angle lenses.

Screens of the present invention may be used in any viewing system in which an image is projected on one side of a screen and viewed from the opposite side, but has particular application in television projection systems using the well known Schmidt optical system or an equivalent system for enlarging the image formed on the viewing screen of a picture tube of relatively small diameter.

One of the major problems in television development has been that of obtaining adequate brightness in the reproduced picture. This problem has been particularly difficult in the case of projection receivers, where large pictures are sought. In the first place, the brightness of the picture is reduced in proportion to the optical enlargement of the image, since no additional light is produced in the process, and, in the second place, the efficiency of projection optical systems is relatively low.

A non-directional diffusing projection screen diffuses the light of the picture in all directions so that the picture is seen with approximately the same brightness from whatever angle it is viewed. However, viewing from extreme angles is not desirable because of the accompanying distortion of perspective. Thus, the light sent to wider angles is largely wasted.

It is apparent, therefore, that the brightness of the picture viewed at a practical angle may be increased if this light, which would otherwise be sent out at extreme angles and wasted, is concentrated within useful viewing angles. A screen which accomplishes this is called a directional screen. A particular type of directional screen is described in co-pending application No. 583,356, filed March 17, 1945, and now Patent No. 2,510,344, of Russell R. Law, and assigned to the present assignee. The present invention is an improvement in the screens described in the said application.

The principal object of the present invention is to provide an improved projection screen of the directional type in which a maximum amount of gain is obtained with a negligible degree of interference effect due to the presence of embossed lens patterns on either side of the screen, and which permits an even distribution of transmitted light throughout the normal viewing angle.

Another object is to provide a laminated type of directional viewing screen in which the interlayer is of a material which forms an integral bond with the two outer lens sheets.

Another object of the invention is to provide a directional screen having different lens patterns on either side and having a definite but slight amount of moiré or interference effect.

Another object of the invention is to provide a laminated projection screen having a diffusing interlayer in which the diffusing material allows a high percentage of light transmission but provides an even diffusing effect.

Still another object of the present invention is to provide a laminated directional viewing screen in which all of the normal interfaces within the screen are substantially eliminated as far as optical effects are concerned.

These and other objects and advantages, together with certain preferred details of construction, will be apparent and the invention, itself, will be best understood by reference to the following specification and to the accompanying drawings in which.

It is considered that, for television viewing in the home, the ideal screen should provide uniform brightness within an angular field of ±10 degrees in the vertical direction and ±30 degrees in the horizontal direction. Screens in actual use provide for a horizontal viewing angle of between ±20 and 30 degrees.

Figure 1:
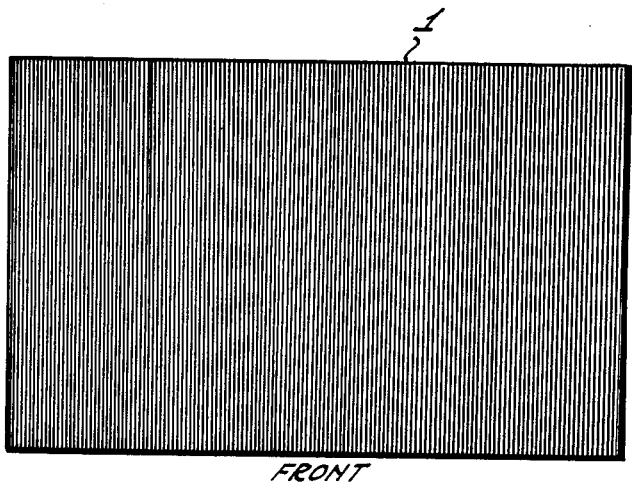
Fig. 1 is a front elevation of a translucent viewing screen construction, in accordance with the present invention.

One method of making these screens is described in the aforementioned co-pending application. Essentially, a screen of this type consists of two outer substantially flat sheets 1 and 2 having a diffusing interlayer 3 in between the two. The flat sheets may be of a synthetic resinous material, such as polymethyl methacrylate, having special figures molded therein to produce the effect of lenses. As shown in Fig. 1, the front of the screen may preferably consist of a multiple, vertical cylinder lens, each element of which is of .020 inch focal length. It may have about 100 vertical cylinder lenses per inch on the outside face and should be flat upon the other. The radius of curvature of the vertical ribs may be about .010 inch.

Figure 2:
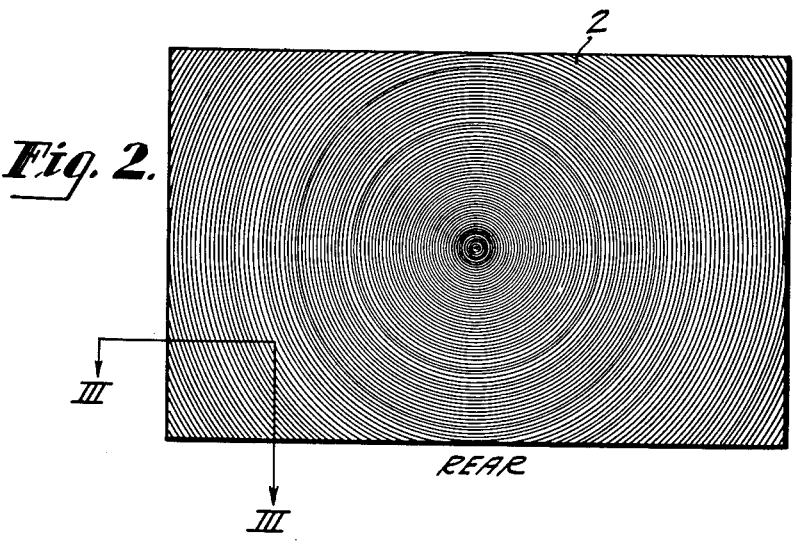
Fig. 2 is a rear elevation of the viewing screen of Fig. 1.
Figure 3:
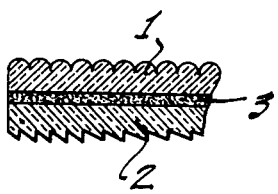
Fig. 3 is a sectional view taken along the line III—III of Fig. 2.

As shown in Fig. 2, the rear face preferably comprises a transparent sheet about .0625 inch thick, having circular or spiral corrugations on one side, which is to face outward, and being flat on the other. The circular corrugations are molded to form a field lens of the "Fresnel" lighthouse type. The focal length may be approximately between 25 and 50 inches and the number of circular or spiral corrugations may be about 50 per inch. The corrugations or grooves in the sheet 2 are preferably of the stepped construction shown in Fig. 3 and the inclined surface of the outermost riser is inclined at an angle of about 45° with respect to the horizontal. The other risers are of progressively decreasing slopes as they approach the common center of the rings and screen. Lenses of this type may be stamped or molded from a matrix made as described in co-pending application No. 658,351, filed March 29, 1946, and now Patent No. 2,441,747, of R. V. Beshgetoor, which is assigned to the present assignee, as well as by other methods conventional in the art.

When two elements, constructed as above described, are combined into a projection screen with the vertical ribs facing the viewer and the "Fresnel" lens facing the projector, and a scene is projected onto it, there appears to the eye an annoying geometric beat or moiré effect which interferes with the projected picture. To eliminate this moiré effect and to diffuse the light evenly, the projection screen, as described in co-pending application No. 583,356, utilized an interlayer of gelatin or gelatin paper between the two elements. This screen provided a light gain for a viewer within the transmitting angle but had the undesirable features of tending to separate and buckle due to wrinkling of the gelatin. This also caused loss of contrast and definition.

In addition to the disadvantages already mentioned, directional screens of the type described above have had other disadvantages due to inherent characteristics of structure. Because of the impossibility of obtaining perfect bonding between the gelatin interlayer sheet and the outer sections, very thin air films have existed on either side of the interlayer sheet. This has resulted in the formation of four interfaces; i. e., plastic-air, air-gelatin, gelatin-air, and air-plastic, each of which has reduced light transmission by about 5 per cent due to interfacial reflections. Two additional interfaces, of course, exist on the outer surfaces of the lens sheets, each of which has reduced transmission by another 5 per cent. Since some light is absorbed by the diffusing medium, the total result has been that maximum transmission of previous screens has been only about 64 per cent.

The present invention consists essentially in the substitution of a different interlayer material from that previously used. The improved interlayer may consist of any one of several film-forming materials but, in a preferred form, comprises a sheet of polyvinyl chloride about .010 inch thick, properly plasticized and stabilized, and containing an amount of silica diffusing material just sufficient to bring moiré to an unobjectionable amount without eliminating it altogether. The screen is made by placing the polyvinyl chloride sheet between two sheets of polymethyl methacrylate and pressing between the platens of a heated press. At the same time the laminating action is carried out, the lens elements are embossed in the surfaces.

An example of the composition of a suitable interlayer diffusing sheet is as follows:

| | Per cent by weight |
|---|---|
| Polyvinyl chloride resin | 45 |
| Dioctyl phthalate | 36.8 |
| Diffusing medium | 14.4 |
| Dibutyl-1^n-dilaurate | 1 |
| Phenol salicylate | 1.8 |
| Stearic acid | 1 |

In the above example, a particular type of diffusing medium has been found to give excellent results in providing maximum light transmission with evenly distributed diffusion of light. This diffusing material is a soft amorphous form of silica found as a natural ore and ground to colloidal fineness, for example, such that 98 per cent will pass through a 325 mesh screen. The chemical analysis of this material is:

| | Per cent |
|---|---|
| Silica ($SiO_2$) | 99.15 |
| Iron oxide ($Fe_2O_3$) | 0.10 |
| Aluminum oxide ($Al_2O_3$) | 0.40 |
| Calcium oxide | 0.20 |
| Magnesium oxide | 0.038 |

The metallic oxides impart translucency to the particles without rendering them opaque when distributed in thin layers. Moreover, each minute particle appears to have a number of reflecting facets which result in multiple reflection occurring throughout the diffusing layer.

The amount of diffusing medium preferred is such as to give about 84 per cent light transmission to the sheet. Other diffusing media may be used which have comparable light diffusing and transmitting ability. Also, different amounts of the illustrated diffuser may be incorporated in the interlayer sheet with consequent deviation from the optimum results. For example, if less diffuser is used, moiré patterns will become more apparent to the eye of the observer and a point will be reached where they become highly annoying. More diffusing material may be used but this cuts down light transmission proportionately. The plasticizers and stabilizers are conventional and may be replaced with others equally well known.

In the present invention, the improved interlayer sheet made as above described is laminated between the two outer lens sheets with the aid of heat and pressure. The nature of the lens sheets and the interlayer is such that a perfectly integrated bond is obtained having no air films formed within the structure. As a consequence, four optical interfaces are eliminated and the light transmission is increased about 20 per cent due to this effect, alone. The indexes of refraction of the two outer sections and the interlayer are approximately equal; hence, no reflections are introduced due to different materials in the various layers of the laminated structure.

Although previous articles of this same type, which are the subject of the aforementioned co-pending applications, were designed to completely eliminate moiré effect, it was unexpectedly found that an improvement could be obtained if the amount of diffusing material in the interlayer sheet were designed to give a percentage of transmission sufficiently high to almost, but not quite, eliminate moiré effect for one viewing the screen at a very close distance. The moiré cannot be seen at all, however, at normal viewing distances of about 4 feet or more.

Within the scope of the present invention, the outer sheets may be made of materials other than polymethyl methacrylate. Examples are:

polystyrene, or cellulose acetate, cellulose acetate-butyrate, or other cellulose esters.

It is also possible to use films of material other than polyvinyl chloride for the interlayer sheet. Polyvinyl butyral may be used, for example. The essential thing is to have sheets which can be laminated to form an integral unit and which will all have approximately the same indexes of refraction. Also of importance, although more subsidiary in nature, is the amount and type of diffusing material used in the interlayer sheet. To obtain optimum results, this must be used in amounts such as to permit optimum transmission without, at the same time, causing an undesirable amount of moiré effect to appear. In the example given, the diffusing medium absorbs a percentage of light of the order of 6 per cent. The type of diffusing medium is also important in that it should promote multiple reflection between particles and, preferably, be somewhat translucent. The improvements obtained as a result of the present invention are due to the combination of an interlayer sheet, made as described, with directional lens sheets of the kind specified. Viewing screens made according to the present invention have a light gain of between 7 and 7½ with practically no "hot spot" effect; that is, no spots which are glaringly bright at the expense of others which have too little light transmission. By light gain is meant the ratio of brightness of the screen to the illumination of the screen. In English units it becomes the ratio of brightness of the screen in foot-lamberts to incident illumination in lumens per square foot. Unless otherwise specified, the brightness is assumed to be measured in a direction normal to the screen.

There has thus been described a viewing screen of improved characteristics, especially designed for systems in which the amount of available light for projection is limited. Although the screens have been described as particularly useful in television projection systems, they may be used in any equivalent optical system such as rear projection movies.

I claim as my invention:

1. A rear view projection screen comprising a laminated structure of two substantially flat transparent outer sections and an interlayer sheet integrally bonded therewith, one of said sections having a Fresnel type lens of about 50 lines per inch formed on its outer surface, the other of said sections having about 100 parallelly arranged vertical ribs per inch formed on its outer surface, and said interlayer comprising a sheet of normally transparent material having an index of refraction approximately the same as that of said sections and having incorporated therein about 14.4 per cent of translucent silica of colloidal fineness whereby said screen has a light transmission value of about 84 per cent.

2. A screen according to claim 1 in which said Fresnel type lens has a focal length of 25 to 50 inches.

3. A rear view projection screen comprising a laminated structure of two substantially flat transparent outer sections and an interlayer sheet integrally bonded therewith, one of said sections having a Fresnel type lens of about 50 lines per inch formed on its outer surface, the other of said sections having about 100 parallelly arranged vertical ribs per inch formed on its outer surface, and said interlayer comprising a sheet of normally transparent material having an index of refraction approximately the same as that of said sections and having incorporated therein an amount of translucent silica of colloidal fineness such that said screen has a light transmission value of about 84 per cent.

4. A rear view projection screen comprising a laminated structure of two substantially flat transparent outer sections and an interlayer sheet integrally bonded therewith, one of said sections having a Fresnel type lens of about 50 lines per inch formed on its outer surface, the other of said sections having about 100 parallelly arranged vertical ribs per inch formed on its outer surface, and said interlayer comprising a sheet of normally transparent material having an index of refraction approximately the same as that of said sections and having incorporated therein an amount of a diffusing medium such that said screen has a light transmission value of about 84 per cent.

5. A rear view projection screen comprising a laminated structure of two substantially flat transparent outer sections and an interlayer sheet integrally bonded therewith, one of said sections having a Fresnel type lens of about 50 lines per inch formed on its outer surface, the other of said sections having about 100 parallelly arranged vertical ribs per inch formed on its outer surface, and said interlayer comprising a sheet of normally transparent material having an index of refraction approximately the same as that of said sections and having incorporated therein an amount of a diffusing medium such that moiré effect is just eliminated at a viewing distance of about 4 feet.

6. A rear view projection screen comprising a laminated structure of two substantially flat transparent outer sections and an interlayer sheet integrally bonded therewith, one of said sections having a Fresnel type lens formed on its outer surface, the other of said sections having a multiplicity of parallelly arranged vertical ribs formed on its outer surface, and said interlayer comprising a sheet of normally transparent material having an index of refraction approximately the same as that of said sections and having incorporated therein an amount of a diffusing medium such that moirée effect is just eliminated at a viewing distance of about 4 feet.

IOURY G. MALOFF.

REFERENCES CITED

The following references are of record in the file of this patent:

UNITED STATES PATENTS

| Number | Name | Date |
|---|---|---|
| 2,024,382 | Newman | Dec. 17, 1935 |
| 2,124,587 | Morrissey | July 26, 1938 |
| 2,132,405 | Draeger | Oct. 11, 1938 |
| 2,141,746 | Gray | Dec. 27, 1938 |
| 2,180,113 | Land | Nov. 14, 1939 |
| 2,200,646 | Strong et al. | May 14, 1940 |
| 2,207,835 | Sukumlyn | July 16, 1940 |
| 2,279,555 | Browne et al. | Apr. 14, 1942 |
| 2,294,477 | Moss | Sept. 1, 1942 |
| 2,326,042 | Lessman | Aug. 3, 1943 |
| 2,370,263 | Schweizer | Feb. 27, 1945 |
| 2,378,252 | Staehle et al. | June 12, 1945 |